United States Patent [19]

Zimmer

[11] Patent Number: 4,575,422
[45] Date of Patent: Mar. 11, 1986

[54] PAPER ROLL FILTER STRUCTURE

[76] Inventor: Cornelius P. Zimmer, Sürst 9, 5308 Rheinbach, Fed. Rep. of Germany

[21] Appl. No.: 446,963

[22] Filed: Feb. 25, 1983

[51] Int. Cl.⁴ .................... B01D 27/10; B01D 27/12
[52] U.S. Cl. .................................. 210/130; 210/168; 210/232; 210/235; 210/438; 210/446
[58] Field of Search ............... 210/168, 445, 446, 447, 210/448, 438, 439, 483, 232, 233, 235, 240, 238, 130, 131, 132, 133; 55/309, 502

[56] References Cited

U.S. PATENT DOCUMENTS

| | | | |
|---|---|---|---|
| 2,793,752 | 5/1957 | Jay | 210/448 |
| 3,224,590 | 12/1965 | Nord et al. | 210/438 |
| 3,240,347 | 3/1966 | Zievers et al. | 210/438 |
| 3,504,803 | 4/1970 | Brayman | 210/439 |
| 3,615,018 | 10/1971 | Johnson | 210/439 |
| 3,633,755 | 1/1972 | Chaneton | 210/439 |

FOREIGN PATENT DOCUMENTS 608754  9/1948  United Kingdom ............... 210/439

Primary Examiner—Ernest G. Therkorn

[57] ABSTRACT

The invention relates to a filter for regenerating oil, especially from combustion engines, with an exchangeable cylindrical filter-cartridge, being of filter-tissue-paper wrapped tightly around a thin-wall-carton-tube. The filter-cartridge-center is supported by a rubber-tube, being slightly smaller in diameter than the carton-tube. The thin-wall-carton-tube will be ruptured by the oil-pressure existing on the outer circumference of the carton-tube, at such weak places caused by the channels running lengthwise the rubber-tube, making the oil-flow through the filter-cartridge possible. The filtered oil will collect in channels passing to the exit.

3 Claims, 5 Drawing Figures

PAPER ROLL FILTER STRUCTURE

CROSS REFERENCE TO RELATED APPLICATION

This application corresponds to European Patent Office application Ser. No. 8210 5677.7 filed June 26, 1982.

BACKGROUND OF THE INVENTION

1. Field of the Invention

The present invention generally relates to oil filters. Specifically, the invention relates to oil filters with disposable paper rolls.

2. Description of the Prior Art

Oil filters including a carton tube about which filtering material is tightly wrapped are known. Such known filters require use of a carton tube of a wall thickness heavy enough to withstand the oil pressure coming from the outer circumference of the filtering material to the hollow center of the filter cartridge. In contrast, in the present invention, the carton tube is perforated, making it possible for the oil to collect oil in the center of the cartridge. The collected oil will flow to the exit of the filter housing and then to the crankcase of the engine.

SUMMARY OF THE INVENTION

The invention relates to an oil-filter, especially designed to regenerate oil in combustion-engines. The filter-element consists of a thin-wall-carton-tube, upon which tissue paper is tightly wrapped. Perforation of the carton is accomplished by the oil-pressure within the filter-housing, exerting itself against the thin-wall-carton-tube circumference thereby passing the thin-wall of the carton tube into the empty spaces of the channels formed by the ribs running lengthwise on the outer circumference of the rubber-tube. A specially designed rubber-tube, which has a star-like outer circumference having a diameter slightly smaller than the carton-tube inside diameter upon which the filter-tissue-paper is tightly wrapped, is provided. The rubber-tube is placed in the center of the cartridge, being of tissue-paper and a thin-wall-carton-tube. The top of the rubber-tube is covered by a circular-shaped-element, having a hollow space provided in the center which holds a spring, which presses a pointed-valve-cylinder against a seat, provided by the cover of the filter-housing. The same circular element also fits over the circular top of the rubber-tube, which is tightly pressed together by screws in the cover. The bottom of the rubber-tube is pressed against a circular-bottom-element, which provides, with its elevated-circular-collar, a seal between the carton-tube, or cartridge. The circular bottom element being partly perforated on its elevated circular-collar, fits into the bottom hole of the rubber-tube, sealing same against oil leakage. As the oil enters the filter housing, it also fills the inner space of the rubber-tube, closing the check-valve when the inner space of the rubber tube is filled with oil and at the same time preventing an over-pressure in the rubber-tube.

Oil-pressure is likewise exerted against the outer circumference of the tissue-paper, penetrating same and exerting pressure against the thin-wall-carton-tube, of which the carton-material, being softened by the hot oil, is now pressed into the star-like shape of the rubber-tube, respectively, the empty spaces formed by the channels as a result of the star-like-shape of the rubber-tube running lengthwise the rubber-tube in which the filtered oil can pass to the exit. The rubber-tube being stiffened by the hydraulic action of the oil within the center space of the rubber-tube, thus giving support to the filter cartridge, prevents collapse of same. The star-like-ribs of the rubber-tube can be reinforced, with lengthwise sharp knifes being embedded in the rubber material making the rupture of the carton-tube, being softened by the hot oil, more easy and certain. According to the invention the operation of first perforating the carton-tube is thus eliminated, saving the cost of the extra operation.

As the cartridge need be exchanged, the top of the filter-housing must be lifted up. In so doing, the rubber-tube is also lifted up opening the bottom seal of the rubber-tube, permitting the oil to run out of the rubber-tube, freeing itself by contraction away from ruptured carton-tube for easy removal.

DESCRIPTION OF THE PREFERRED EMBODIMENT

Figure 1:
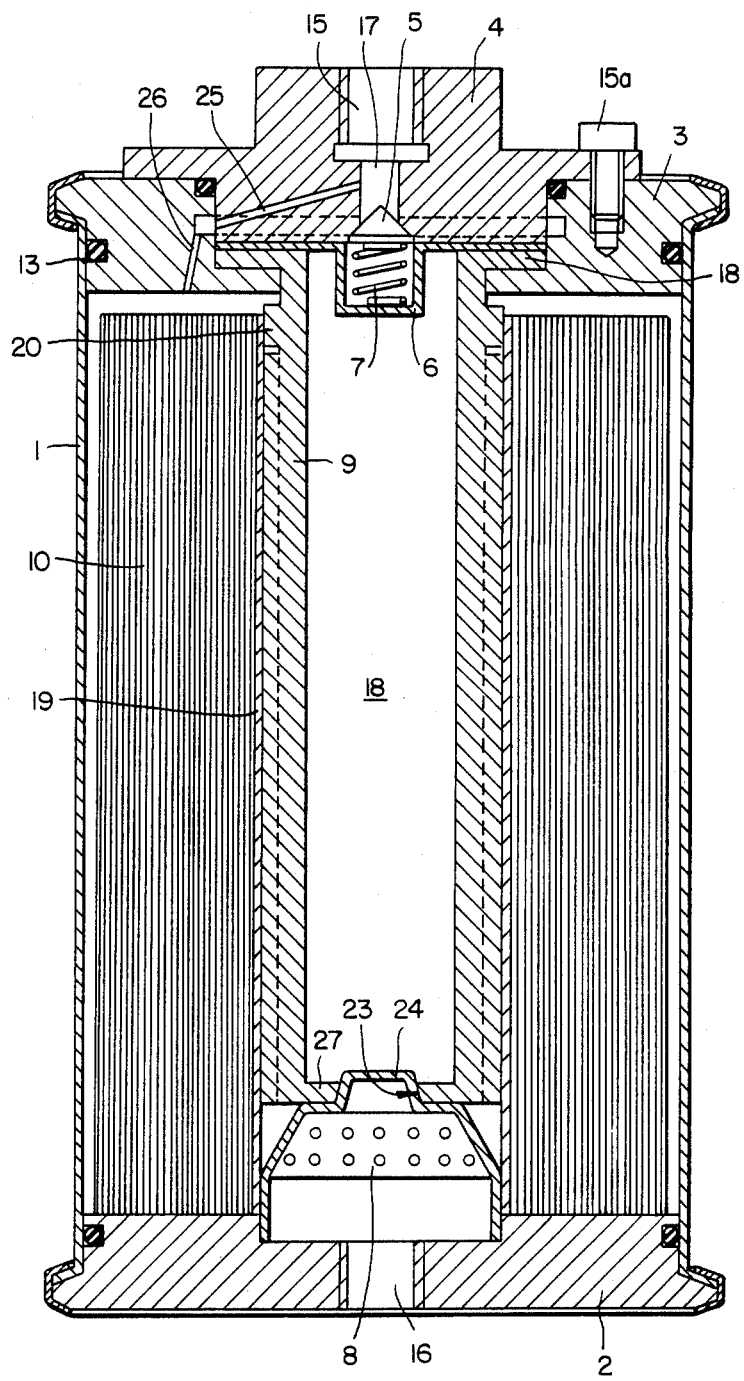
FIG. 1 is a sectional view of the filter cartridge.

A cylindrical-filter-housing 1 is closed on top and bottom by a circular plate 2 and 3, having been provided with grooves 13 that hold O-rings to seal off the filter-housing 1.

Element 6 holds a spring 7 and a pressure-responsive valve 5 that seals part 4. Above pressure-responsive-valve 5 in oil intake 15. From this intake boring and between pressure-responsive valve 5 and top of the cylindrical housing a jet-like boring 25 leads oil to the outer part of the cartridge 10.

The jet-like boring 25 is extended by the channel 26 which leads from the circular square opening connecting 25 and 26. Passage 17 connects oil inlet 15 with pressure responsive valve 5. Oil enters from inlet 15, through 17, opens pressure-responsive valve 5 and fills rubber-tube 9. The oil pressure expands the rubber-tube until the expansion finds resistance against carton-tube 19 on which the filtering-tissue paper 10 is tightly wrapped. The bottom part of the rubber-tube 9 is provided with an opening 23 which is sealed by annular element 8 and surface 24. The element 8 is provided with holes to permit the filtered oil flow through exit 16. The circular element 8 extends high enough from the bottom part 2 so as to fit and seal inside the carton-tube 9, is forced between part 3 and 4 by screw-pressure making a perfect seal and holding rubber-tube 9 together tightly with the cover 3.

Figure 2:
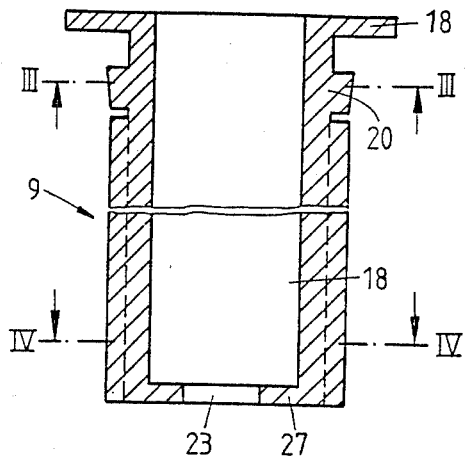
FIG. 2 is a sectional view of the rubber tube.
Figure 3:
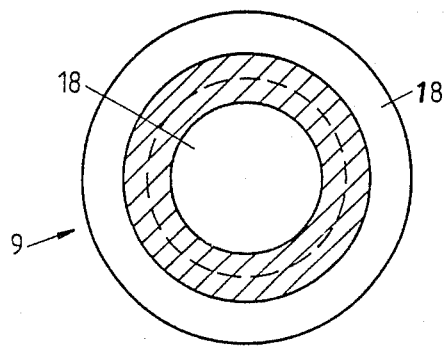
FIG. 3 is a cross-sectional view of cut III to III of FIG. 2.
Figure 4:
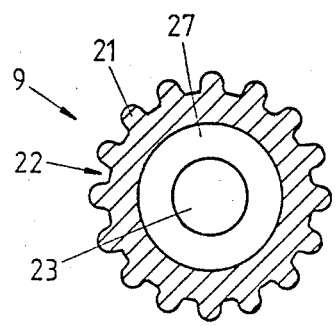
FIG. 4 is a cross-sectional view of cut IV to IV of FIG. 2.
Figure 5:
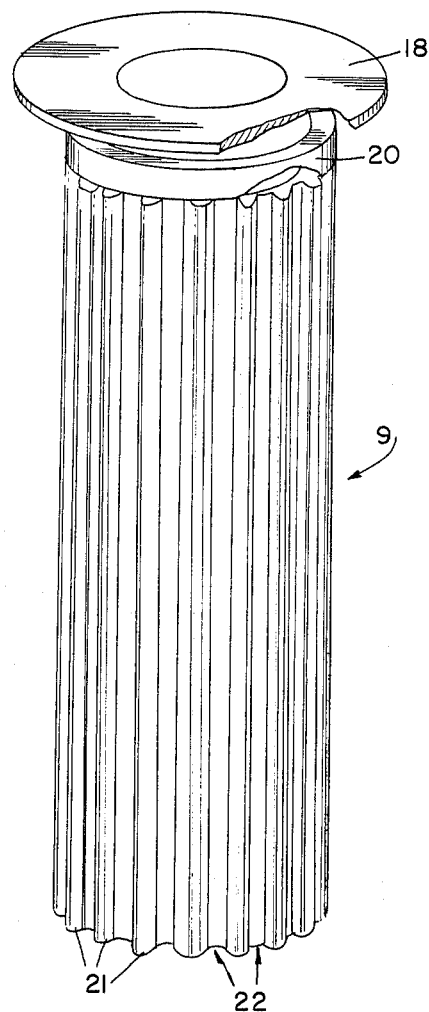
FIG. 5 is a perspective view of the rubber tube.

As can be seen in FIG. 2, 3, and 4, rubber-tube 9 has a sealing circular plate or flange like top 18. Right below this sealing circular plate or flange, cut III—III shows rubber collar 20 slightly tapered to fit into cartridge 10 and makes a seal around the top of the thin-wall-carton-tube 19.

FIG. 4 illustrates a horizontal cut through the rubber-tube 9 which has a star or teeth-like shape providing channels 22. Wall-end 27 of the tube 9 has an opening 23. The channels 22 are formed by flutes 21 and grooves 22 running lengthwise from top to bottom of the rubber tube 9, permitting oil that has passed through filter-tissue-paper 10 against the thin-wall-carton-tube 19, which is ruptured along flutes 21 permitting oil to flow along the channels 22 through element 8 and out exit 16. The channels 22 which run lengthwise the tube 9 formed partly by the thin-wall-carton-tube 19 and the high-points of the rubber tube 9. These channels start under the tapered smooth collar and extend to the bottom of the tube.

The oil-pressure in these channels is zero and the thin-wall-carton-tube 19 being softened by the hot oil, rupture of the carton-tube 19 along the channels 22 will be most easily made, as the carton-material is forced into the channels 21 and 22 which is an important part of the invention.

Additional rupture of the thin-wall-carton-tube 19, sharp knifes embedded in the rubber material 9 extending from the solid part of the tube 9 to the point of 21 cutting into the oil-saturated carton material of the carton tube 19 making rupture still easier.

When exchanging the cartridge 10, the cover 3 which is provided with an O-ring fitting in 13 and seal the cover and housing 1 must be lifted up.

In doing so the rubber-tube 9 will be lifted off its opening of the element 8 releasing the oil and pressure inside the rubber-tube 9. The rubber-tube 9 will contract away from the carton-tube 19 making the separation of the rubber-tube 9 and the filter-cartridge 10 easy possible.

I claim:

1. A filter for regenerating oil in combustion engines with a replaceable tissue filter roll comprising;
    a cylindrical filter housing having a top and bottom sealed by first and second circular plates, respectively, said first plate containing an inlet and said second plate containing an outlet;
    a replaceable tissue filter roll wrapped on a thin wall carton tube;
    a rubber tube located within and supporting said thin wall carton tube against collapse having lengthwise running flutes around its outer-circumference, said rubber tube having a sealing circular plate at its top end and a tapered smooth collar below the circular plate;
    an oil pressure responsive bypass in flow communication with the inlet and an inner cylindrical space within the rubber tube; and
    an annular element closing the bottom of the rubber tube and provided with holes that form a flow path between the flutes of the rubber tubes and said outlet in said second plate, whereby the thin wall carton tube is punctured by oil pressure exerted from outside the thin wall carton tube upon the flutes and oil within the rubber tube exserting back pressure against the tube.

2. A filter according to claim 1 further comprising channels formed by the flutes running lengthwise on the rubber tube starting under the tapered smooth collar and extending to the bottom of the rubber tube.

3. A filter according to claim 2 further comprising sharp knifes reinforcing the flutes to aid puncturing.

* * * * *